United States Patent
Tsuchimoto et al.

(10) Patent No.: US 11,936,309 B2
(45) Date of Patent: Mar. 19, 2024

(54) PERMANENT-MAGNET-SYNCHRONOUS ELECTRIC MOTOR CONTROL DEVICE AND ELECTRIC POWER STEERING DEVICE PROVIDED WITH SAME

(71) Applicant: Mitsubishi Electric Corporation, Tokyo (JP)

(72) Inventors: Yuya Tsuchimoto, Tokyo (JP); Tatsuya Mori, Tokyo (JP); Akira Furukawa, Tokyo (JP); Isao Kezobo, Tokyo (JP); Genki Fujii, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 17/795,576

(22) PCT Filed: May 22, 2020

(86) PCT No.: PCT/JP2020/020242
§ 371 (c)(1),
(2) Date: Jul. 27, 2022

(87) PCT Pub. No.: WO2021/234934
PCT Pub. Date: Nov. 25, 2021

(65) Prior Publication Data
US 2023/0097479 A1 Mar. 30, 2023

(51) Int. Cl.
*H02P 21/00* (2016.01)
*H02P 21/22* (2016.01)
*B62D 5/04* (2006.01)

(52) U.S. Cl.
CPC .......... *H02P 21/0089* (2013.01); *H02P 21/22* (2016.02); *B62D 5/046* (2013.01); *H02P 2207/05* (2013.01)

(58) Field of Classification Search
CPC .. H02P 21/0089; H02P 21/22; H02P 2207/05; B62D 5/046
See application file for complete search history.

(56) References Cited

U.S. PATENT DOCUMENTS

| | | | |
|---|---|---|---|
| 2013/0141023 A1* | 6/2013 | Sugita | H02P 21/18 318/400.14 |
| 2018/0109217 A1* | 4/2018 | Lee | H02P 21/0089 |

(Continued)

FOREIGN PATENT DOCUMENTS

| | | |
|---|---|---|
| JP | 4380437 B2 | 12/2009 |
| WO | 2008/152929 A1 | 12/2008 |

OTHER PUBLICATIONS

International Search Report for PCT/JP2020/020242 dated Jul. 21, 2020.

*Primary Examiner* — Cortez M Cook
(74) *Attorney, Agent, or Firm* — Sughrue Mion, PLLC; Richard C. Turner

(57) ABSTRACT

A permanent-magnet-synchronous electric motor control device includes: a reference voltage value calculation unit for calculating a reference voltage value; an output voltage value calculation unit for calculating an output voltage value on the basis of a voltage command; a current weakening command calculation unit for calculating a current weakening command on the basis of the reference voltage value and the output voltage value; a voltage command calculation unit for calculating the voltage command on the basis of the current weakening command; and a power converter for supplying power to a permanent-magnet-synchronous electric motor on the basis of the voltage command. The current weakening command calculation unit calculates the current weakening command in which a high-frequency component (Continued)

is amplified on the basis of the difference between the reference voltage value and the output voltage value.

8 Claims, 5 Drawing Sheets

(56) References Cited

U.S. PATENT DOCUMENTS

2021/0058018 A1* 2/2021 Tsuchimoto ............ H02P 21/22
2022/0006403 A1* 1/2022 Sasaki ..................... H02P 21/20

* cited by examiner

PERMANENT-MAGNET-SYNCHRONOUS ELECTRIC MOTOR CONTROL DEVICE AND ELECTRIC POWER STEERING DEVICE PROVIDED WITH SAME

CROSS REFERENCE TO RELATED APPLICATIONS

This application is a National Stage of International Application No. PCT/JP2020/020242 filed May 22, 2020.

TECHNICAL FIELD

The present disclosure relates to a permanent-magnet-synchronous electric motor control device, and an electric power steering device provided with the same.

BACKGROUND ART

In a permanent-magnet-synchronous electric motor, in association with increase in the rotation speed, induced voltage is increased, and voltage saturation occurs due to restriction of power supply voltage, whereby it becomes difficult for current to flow. As a result, the output torque is decreased in a high-speed rotation region.

With respect to a permanent-magnet-synchronous electric motor, as a method for preventing decrease of the output torque in a high-speed rotation region, a method referred to as flux weakening control is performed. In the flux weakening control, negative current is caused to flow to d-axis current, whereby the magnetic flux in the d-axis direction is weakened to suppress voltage saturation. A current command for d-axis current when performing flux weakening control is referred to as a current weakening command.

For example, in a case of a conventional permanent-magnet-synchronous electric motor, a method in which a current weakening command is controlled in accordance with the magnitude of the rotation speed is known (see Patent Document 1, for example). In a case of another permanent-magnet-synchronous electric motor, a method in which a current weakening command is controlled in accordance with the magnitude of power supply voltage is known (see Patent Document 2, for example)

CITATION LIST

Patent Document

Patent Document 1: Japanese Laid-Open Patent Publication No. 2006-20411
Patent Document 2: WO2008/152929

SUMMARY OF THE INVENTION

Problems to be Solved by the Invention

However, in a conventional permanent-magnet-synchronous electric motor in which a current weakening command is controlled in accordance with the magnitude of the rotation speed, there is a problem that the current weakening command cannot follow a sharp change in the rotation speed. Also in a conventional permanent-magnet-synchronous electric motor in which the current weakening command is controlled in accordance with the magnitude of power supply voltage, there is a problem that the current weakening command cannot follow a sharp change in the rotation speed.

The present disclosure has been made in order to solve the problems as described above. An object of the present disclosure is to provide a permanent-magnet-synchronous electric motor control device that can cause a current weakening command to follow a sharp change in the rotation speed.

Solution to the Problems

A permanent-magnet-synchronous electric motor control device of the present disclosure includes: a reference voltage value calculation unit for calculating a reference voltage value on the basis of power supply voltage; an output voltage value calculation unit for calculating an output voltage value on the basis of a voltage command; a current weakening command calculation unit for calculating a current weakening command being a d-axis current command for flux weakening control on the basis of the reference voltage value and the output voltage value; a voltage command calculation unit for calculating the voltage command on the basis of the current weakening command; and a power converter for supplying power to a permanent-magnet-synchronous electric motor on the basis of the voltage command. The current weakening command calculation unit calculates the current weakening command in which a high-frequency component is amplified on the basis of a difference between the reference voltage value and the output voltage value.

Effect of the Invention

Since the permanent-magnet-synchronous electric motor control device of the present disclosure includes the current weakening command calculation unit for calculating a current weakening command in which a high-frequency component is amplified on the basis of the difference between the reference voltage value and the output voltage value, the current weakening command can be caused to follow a sharp change in a rotation speed.

DESCRIPTION OF EMBODIMENTS

Figure 1:
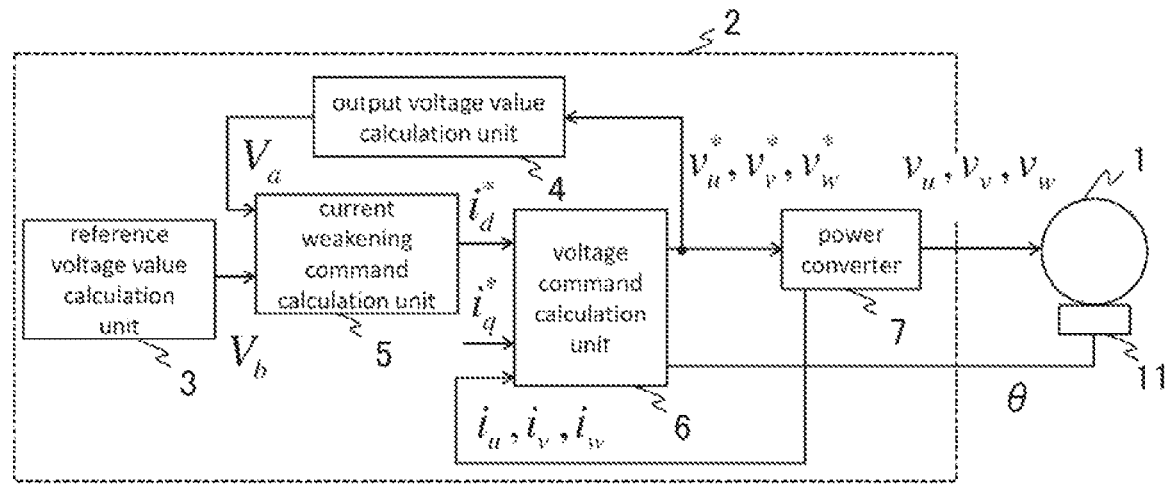
FIG. 1 is a configuration diagram of a permanent-magnet-synchronous electric motor control device according to embodiment 1.

Hereinafter, a permanent-magnet-synchronous electric motor control device and an electric power steering device using the same according to embodiments for carrying out the present disclosure will be described in detail with reference to the drawings. In the drawings, the same reference characters denote the same or corresponding parts.

Embodiment 1

FIG. 1 is a configuration diagram of a permanent-magnet-synchronous electric motor control device according to embodiment 1. In FIG. 1, a permanent-magnet-synchronous electric motor to be controlled by the permanent-magnet-synchronous electric motor control device is also shown.

As a permanent-magnet-synchronous electric motor 1, a motor that is well own in general such as, for example, a surface-magnet-type synchronous motor (SPM: Surface Permanent magnet) or an embedded-magnet-type synchronous motor (IPM: Interior Permanent magnet) can be used. The permanent-magnet-synchronous electric motor 1 has three-phase windings of U phase, V phase, and W phase. In addition, the permanent-magnet-synchronous electric motor 1 has a rotor configured such that a field magnetic flux is generated by a permanent magnet or a field winding.

An angle detector 11 is mounted to the permanent-magnet-synchronous electric motor 1, and detects a rotation angle θ of the permanent-magnet-synchronous electric motor 1. As the angle detector 11, an angle detector such as a resolver or a Hall sensor can be used, for example.

A permanent-magnet-synchronous electric motor control device 2 is composed of a reference voltage value calculation unit 3, an output voltage value calculation unit 4, a current weakening command calculation unit 5, a voltage command calculation unit 6, and a power converter 7. First, operation of each component of the permanent-magnet-synchronous electric motor control device 2 will be briefly described.

The reference voltage value calculation unit 3 calculates a reference voltage value serving as a reference for flux weakening control on the basis of power supply voltage. The output voltage value calculation unit 4 calculates an output voltage value on the basis of a three-phase voltage command related to voltage to be applied to the three-phase windings of U phase, V phase, and W phase. The current weakening command calculation unit 5 calculates a d-axis current command for performing flux weakening control on the basis of the output voltage value and the reference voltage value. The voltage command calculation unit 6 calculates the three-phase voltage command on the basis of the d-axis current command and a q-axis current command. The power converter 7 applies three-phase voltage to the permanent-magnet-synchronous electric motor 1 on the basis of the three-phase voltage command.

Next, operation of each component of the permanent-magnet-synchronous electric motor control device 2 will be described in detail.

The power converter 7 converts power supply voltage $V_{dc}$ supplied from a power supply and applies three-phase voltage $v_u$, $v_v$, $v_w$ to the three-phase windings of the permanent-magnet-synchronous electric motor 1. The power converter 7 is implemented by a power converter such as an inverter. The power converter 7 performs modulation processing on three-phase voltage commands $v_u^*$, $v_v^*$, $v_w^*$ described later, thereby applying AC voltage to each of the U phase winding, the V phase winding, and the W phase winding. Examples of the modulation processing performed by the power converter 7 include a PWM (Pulse Width Modulation) method, a PAM (Pulse Amplitude Modulation) method, and the like, for example.

A current detector (not shown) is mounted to the power converter 7, and detects current flowing to the permanent-magnet-synchronous electric motor 1. The current detector detects current $i_u$ of the U phase winding, current $i_v$ of the V phase winding, and current $i_w$ of the W phase winding. $i_u$, $i_v$, and $i_w$ are collectively referred to as three-phase winding current. The current detector is implemented by using a current detector such as a shunt resistor or a Hall element. As the three-phase winding current $i_u$, $i_v$, $i_w$, detection values obtained from the current detector are used, but without using the current detector, values estimated from a voltage equation or the like may be used. That is, the three-phase winding current of the permanent-magnet-synchronous electric motor 1 is detected or estimated current.

Figure 2:
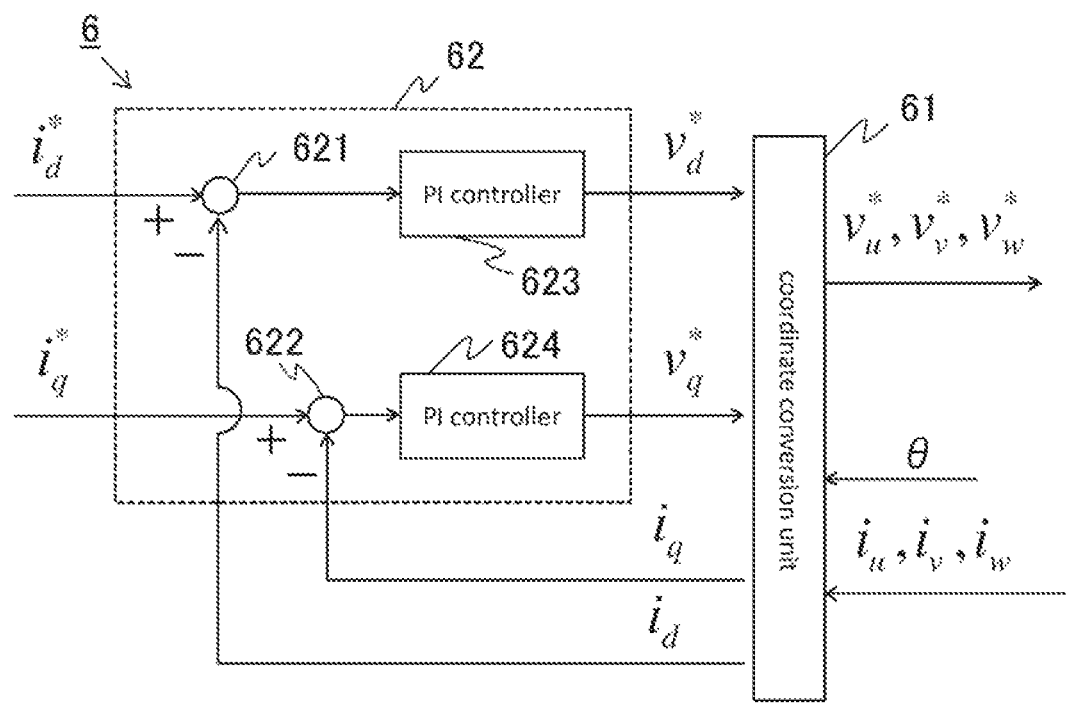
FIG. 2 is a configuration diagram of a voltage command calculation unit according to embodiment 1.

FIG. 2 is a configuration diagram of the voltage command calculation unit 6 in the present embodiment. The voltage command calculation unit 6 includes a coordinate conversion unit 61 and a voltage command generation unit 62.

The coordinate conversion unit 61 performs coordinate conversion on a d-axis voltage command $v_d^*$ and a q-axis voltage command $v_q^*$ on the basis of the rotation angle θ, thereby generating a U phase voltage command $v_u^*$, a V phase voltage command $v_v^*$, and a W phase voltage command $v_w^*$. Further, the coordinate conversion unit 61 performs coordinate conversion on a U phase detection current $i_u$, a V phase detection current $i_v$, and a W phase detection current $i_w$ on the basis of the rotation angle θ, thereby generating a d-axis detection current $i_d$ and a q-axis detection current $i_q$. The d-axis detection current $i_d$ and the q-axis detection current $i_q$ are collectively referred to as detection current. As the rotation angle θ, a detection value obtained from the angle detector 11 is used, but without using the angle detector 11, a value estimated by the power converter 7 may be used. That is, the rotation angle θ of the permanent-magnet-synchronous electric motor 1 is a detected or estimated angle.

The voltage command generation unit 62 generates the d-axis voltage command $v_d^*$ by using a d-axis current command $i_d^*$ and the d-axis detection current $i_d$, and generates the q-axis voltage command $v_q^*$ by using a q-axis current command $i_q^*$ and the q-axis detection current $i_q$. The voltage command generation unit 62 includes two subtractors 621, 622 and two PI controllers 623, 624. The subtractor 621 calculates a deviation between the d-axis current command $i_d^*$ and the d-axis detection current $i_d$. The subtractor 622 calculates a deviation between the q-axis current command $i_q^*$ and the q-axis detection current $i_q$. The PI controller 623 calculates the d-axis voltage command $v_d^*$ for controlling output voltage of the power converter 7 such that the deviation calculated by the subtractor 621 becomes small. The PI controller 624 calculates the q-axis voltage command $v_q^*$ for controlling output voltage of the power converter 7 such that the deviation calculated by the subtractor 622 becomes small.

In the voltage command generation unit 62 of the present embodiment, the PI controller 623 which performs proportional and integral control as feedback control in which the d-axis voltage command $v_d^*$ is calculated with respect to the deviation between the d-axis current command $i_d^*$ and the d-axis detection current $i_d$, is used. The calculation method for the feedback control is not limited thereto, and another calculation method for feedback control may be used. This also applies to the calculation method for feedback control in which the q-axis voltage command $v_q^*$ is calculated.

The d-axis current command $i_d^*$ calculated in the current weakening command calculation unit 5. The calculation method of the q-axis current command $i_q^*$ is not limited in particular, but is calculated by using a calculation method for feedback control such as conventional torque control or rotation speed control, for example.

Figure 3:
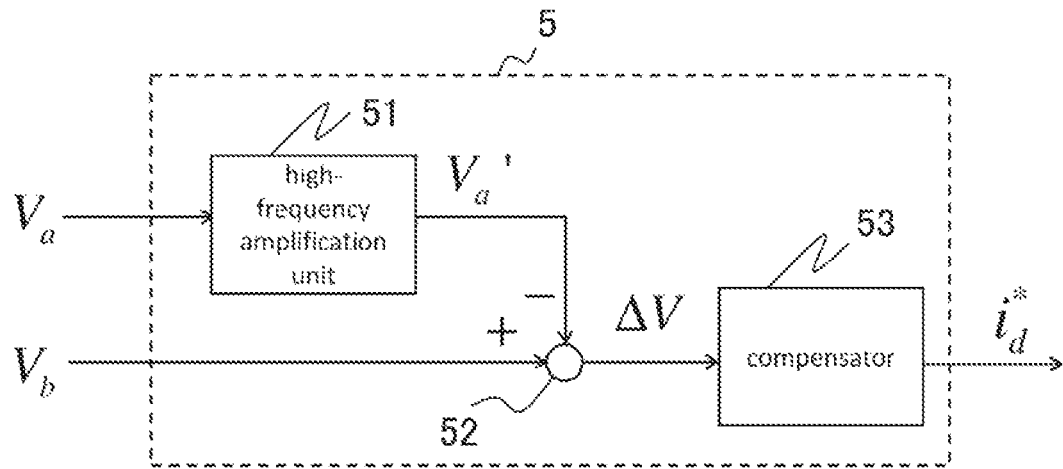
FIG. 3 is a configuration diagram of a current weakening command calculation unit according to embodiment 1.

FIG. 3 is a configuration diagram of the current weakening command calculation unit 5 in the present embodiment. The current weakening command calculation unit 5 of the present embodiment is composed of a high-frequency amplification unit 51, a subtractor 52, and a compensator 53. An output voltage value $V_a$ and a reference voltage value $V_b$ are inputted to the current weakening command calculation unit 5. The output voltage value $V_a$ is a value regarding the magnitude of output voltage of the power converter 7. The output voltage value $V_a$ is calculated by Expression (1) in the output voltage value calculation unit 4 from the three-phase voltage commands $v_u^*$, $v_v^*$, $v_w^*$.

[Mathematical 1]

$$V_a = \sqrt{v_u^{*2} + v_v^{*2} + v_w^{*2}} \qquad (1)$$

The reference voltage value $V_b$ is calculated by Expression (2) by using the power supply voltage $V_{dc}$ and a maximum modulation factor $k_{max}$ in the reference voltage value calculation unit 3. Here, the reference voltage value $V_b$ is a value regarding the maximum voltage that can be outputted in terms of the power supply voltage $V_{dc}$. The maximum modulation factor $k_{max}$ is $k_{max}=1$, for example m represents a margin for the maximum voltage that can be outputted. The margin for the maximum voltage can also be given when $k_{max}$ is set to a value, e.g., 0.9, smaller than the maximum modulation factor.

[Mathematical 2]

$$V_b = \frac{k_{max} \times V_{dc}}{\sqrt{2}} - m \qquad (2)$$

When $V_a = V_b$ is set at the stage of calculation of the current weakening command, $V_a$ increases under influence of a derivative term, voltage disturbance, or the like, and voltage saturation momentarily occurs in some cases. In such a case, when m is made large, a margin can be ensured, and voltage saturation can be easily avoided. Meanwhile, there is also a problem that excessive weakening current is applied when m is too large. Here, in order to prevent excessive weakening current from being applied, m=0 is set. The power supply voltage $V_{dc}$ may be a value obtained by detecting the power supply voltage, or may be a constant set in advance.

The output voltage value $V_a$ is inputted to the high-frequency amplification unit 51 of the current weakening command calculation unit 5. The high-frequency amplification unit 51 amplifies a high-frequency component of the output voltage value $V_a$ to calculate a correction output voltage value $V_a'$. Here, in order to increase the high-frequency component in a frequency band higher than an arbitrary frequency, a phase advance filter F(s) represented by Expression (3) is used as the high-frequency amplification unit 51. The relationship between parameters $\omega_1$, $\omega_2$ of the phase advance filter F(s) is $\omega_1 > \omega_2$. Since the phase advance filter is used as the high-frequency amplification unit 51, complicated calculation and map creation in advance are not required, and a simple configuration can be realized.

[Mathematical 3]

$$F(s) = \frac{\omega_1}{\omega_2} \times \frac{s + \omega_2}{s + \omega_1} \qquad (3)$$

Figure 4:
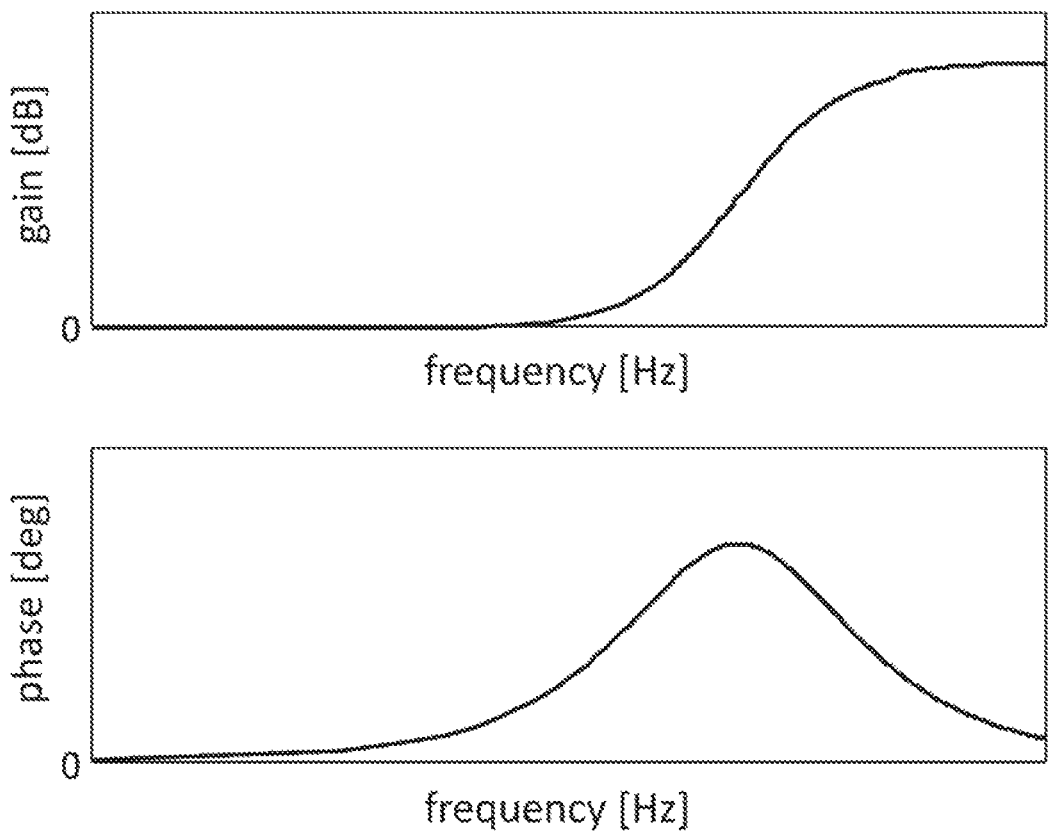
FIG. 4 is characteristics diagrams of a phase advance filter according to embodiment 1.

FIG. 4 shows examples of frequency characteristics of the phase advance filter F(s). In this phase advance filter, the steady gain is 1, and when no sharp voltage change due to a sharp rotation speed change or the like occurs, a performance at a level equivalent to that in conventional art can be obtained. Meanwhile, since the gain in a high-frequency band is increased, when a sharp voltage change has occurred due to a sharp rotation speed change or the like, responsiveness can be improved.

In the present embodiment, the phase advance filter is used as the high-frequency amplification unit 51. However, as long as a high-frequency component can be amplified, another filter may be used. For example, a filter being a combination of a phase advance filter and a lowpass filter can be used as the high-frequency amplification unit 51. When such a filter is used, an unnecessary high-frequency component in which noise is mixed can be blocked while a high-frequency component in a necessary frequency band is amplified.

The subtractor 52 subtracts the correction output voltage value $V_a'$ calculated by the high-frequency amplification unit 51 from the reference voltage value $V_b$, to calculate a voltage deviation $\Delta V$. The compensator 53 calculates the d-axis current command $i_d^*$ on the basis of the voltage deviation $\Delta V$. The compensator 53 may be an integrator or a PI controller. Here, the compensator 53 is an integrator, and is a compensator C(s) represented by Expression (4). An integral gain $K_i$ is determined from a control response $\omega_w$, and an inductance L and a rotation speed $\omega_m$ of the permanent-magnet-synchronous electric motor 1.

[Mathematical 4]

$$C(s) = K_i \times \frac{1}{s} = \frac{\omega_w}{\omega_m \times L} \times \frac{1}{s} \qquad (4)$$

The compensator 53 calculates the d-axis current command $i_d^*$ on the basis of the voltage deviation $\Delta V$ by using the compensator C(s) represented by Expression (4). The d-axis current command $i_d^*$ calculated by the compensator 53 serves as a current weakening command for performing flux weakening control. In this manner, the current weakening command calculation unit 5 calculates the current weakening command for performing flux weakening control.

The permanent-magnet-synchronous electric motor control device having such a configuration calculates, in the current weakening command calculation unit, a current weakening command in which a high-frequency component is amplified on the basis of the difference between the reference voltage value and the output voltage value. Therefore, flux weakening control for avoiding voltage saturation can be performed. Since the permanent-magnet-synchronous electric motor control device amplifies the high-frequency component of the current weakening command, when the rotation speed has sharply changed and the output voltage has sharply changed, the permanent-magnet-synchronous electric motor control device can cause the current weakening command to follow the change. In addition, when the power supply voltage has sharply changed as well, the permanent-magnet-synchronous electric motor control device of the present embodiment can cause the current weakening command to follow the change.

Further, in the current weakening command calculation unit of the present embodiment, a phase advance filter is used as a filter that amplifies the high-frequency component. Therefore, the gain increases in a frequency band higher than a frequency set in advance at the phase advance filter, and thus, the high-frequency component of the current weakening command can be amplified, and responsiveness of the current weakening command can be improved.

Embodiment 2

In the current weakening command calculation unit of embodiment 1, a high-frequency component of the output voltage value $V_a$ is amplified by the high-frequency amplification unit to calculate the correction output voltage value $V_a'$, and the correction output voltage value $V_a'$ is subtracted from the reference voltage value $V_b$ by the subtractor to calculate the voltage deviation $\Delta V$. In a current weakening command calculation unit of embodiment 2, the output voltage value $V_a$ is subtracted from the reference voltage value $V_b$ to calculate the voltage deviation $\Delta V$, and a high-frequency component of the voltage deviation $\Delta V$ is amplified to calculate a correction voltage deviation $\Delta V'$.

Figure 5:
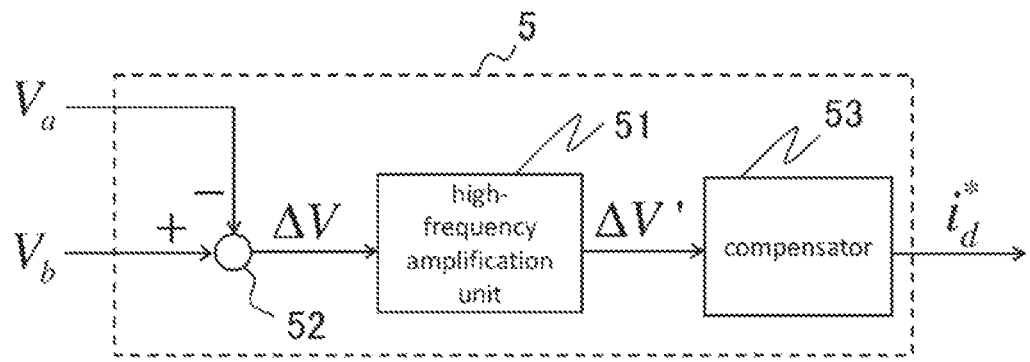
FIG. 5 is a configuration diagram of a current weakening command calculation unit according to embodiment 2.

FIG. 5 is a configuration diagram of a current weakening command calculation unit 5 according to the present embodiment. Similar to the current weakening command calculation unit of embodiment 1, the current weakening command calculation unit 5 according to the present embodiment is composed of a high-frequency amplification unit 51, a subtractor 52, and a compensator 53. As shown in FIG. 5, in the current weakening command calculation unit 5 of the present embodiment, the subtractor 52 subtracts the output voltage value $V_a$ from the reference voltage value $V_b$ to calculate the voltage deviation $\Delta V$. Then, the high-frequency amplification unit 51 amplifies a high-frequency component of the voltage deviation $\Delta V$ to calculate the correction voltage deviation $\Delta V'$. The compensator 53 calculates the d-axis current command $i_d^*$, i.e., the current weakening command, on the basis of the correction voltage deviation $\Delta V'$.

Similar to embodiment 1, the permanent-magnet-synchronous electric motor control device having such a configuration calculates a current weakening command in which a high-frequency component is amplified on the basis of the difference between the reference voltage value and the output voltage value. Therefore, flux weakening control for avoiding voltage saturation can be performed. In addition, since the permanent-magnet-synchronous electric motor control device amplifies the high-frequency component of the current weakening command, when the rotation speed has sharply changed, the permanent-magnet-synchronous electric motor control device can cause the current weakening command to follow the change. In addition, in a case where the output voltage sharply changes when the power supply voltage has sharply changed, the permanent-magnet-synchronous electric motor control device of the present embodiment can cause the current weakening command to follow the change.

Embodiment 3

In the current weakening command calculation unit of embodiment 2, a high-frequency component of the voltage deviation $\Delta V$ is amplified by the high-frequency amplification unit to calculate the correction voltage deviation $\Delta V'$, and the d-axis current command $i_d^*$, i.e., the current weakening command, is calculated by the compensator on the basis of the correction voltage deviation $\Delta V'$. In a current weakening command calculation unit of embodiment 3, a basic current weakening command is calculated by a compensator on the basis of the voltage deviation $\Delta V$, and a high-frequency component of the basic current weakening command is amplified by a high-frequency amplification unit to calculate the current weakening command.

Figure 6:
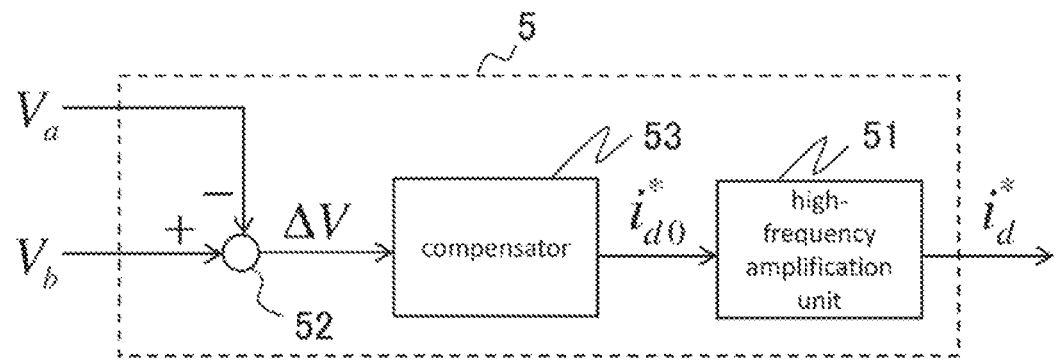
FIG. 6 is a configuration diagram of a current weakening command calculation unit according to embodiment 3.

FIG. 6 is a configuration diagram of a current weakening command calculation unit according to the present embodiment. Similar to the current weakening command calculation unit of embodiment 2, a current weakening command calculation unit 5 according to the present embodiment is composed of a high-frequency amplification unit 51, a subtractor 52, and a compensator 53. As shown in FIG. 6, in the current weakening command calculation unit 5 of the present embodiment, the subtractor 52 subtracts the output voltage value $V_a$ from the reference voltage value $V_b$ to calculate the voltage deviation $\Delta V$. Then, the compensator 53 calculates a d-axis current command $i_{d0}^*$, i.e., the basic current weakening command, on the basis of the voltage deviation $\Delta V$. The high-frequency amplification unit 51 amplifies a high-frequency component of the basic current weakening command $i_{d0}^*$ to calculate the d-axis current command $i_d^*$, i.e., the current weakening command.

Similar to embodiment 1, the permanent-magnet-synchronous electric motor control device having such a configuration calculates a current weakening command in which a high-frequency component is amplified on the basis of the difference between the reference voltage value and the output voltage value. Therefore, flux weakening control for avoiding voltage saturation can be performed. In addition, since this permanent-magnet-synchronous electric motor control device amplifies a high-frequency component of the current weakening command, when the rotation speed has sharply changed, the permanent-magnet-synchronous electric motor control device can cause the current weakening command to follow the change. In addition, in a case where the output voltage sharply changes when the power supply voltage has sharply changed, the permanent-magnet-synchronous electric motor control device of the present embodiment can cause the current weakening command to follow the change.

Embodiment 4

In the current weakening command calculation unit of embodiment 2, a high-frequency component of the voltage deviation $\Delta V$ is amplified by the high-frequency amplification unit to calculate the correction voltage deviation $\Delta V'$. As described in embodiment 1, this high-frequency amplification unit is implemented by the phase advance filter F(s) which increases the high-frequency component in a frequency band higher than a frequency set in advance. In a current weakening command calculation unit of embodiment 4, the high-frequency amplification unit is composed of a highpass filter and a multiplier.

Figure 7:
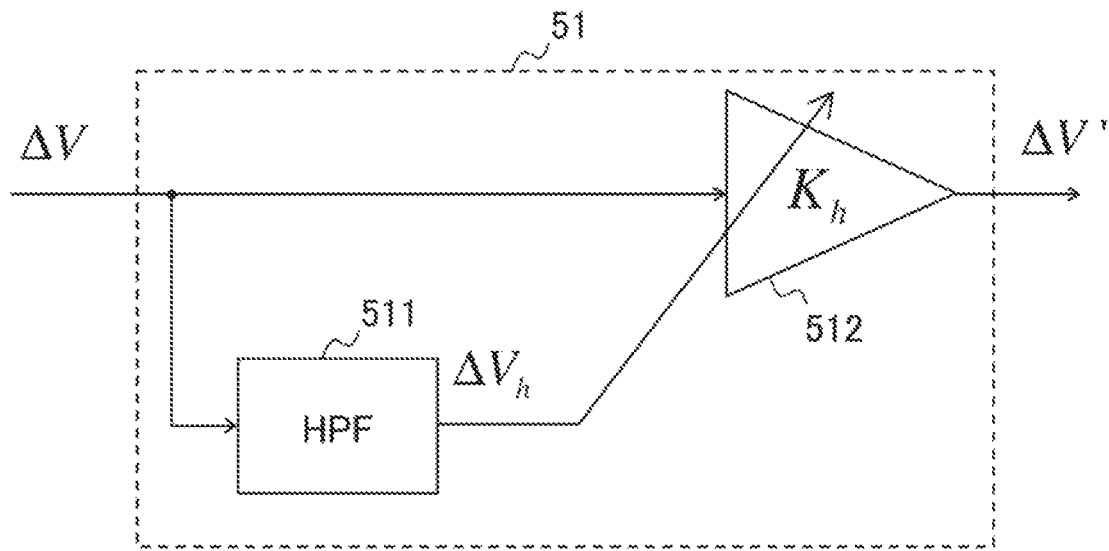
FIG. 7 is a configuration diagram of a high-frequency amplification unit of a current weakening command calculation unit according to embodiment 4.

FIG. 7 is a configuration diagram of the high-frequency amplification unit in the current weakening command calculation unit according to the present embodiment. The configuration of the current weakening command calculation unit of the present embodiment is similar to the configuration of the current weakening command calculation unit of embodiment 2. As shown in FIG. 7, a high-frequency amplification unit 51 of the present embodiment is composed of a highpass filter 511 and a multiplier 512. The highpass filter 511 extracts a high-frequency component $\Delta V_h$ of the voltage deviation $\Delta V$. The multiplier 512 multiplies the voltage deviation $\Delta V$ by a gain $K_h$ and outputs the correction voltage deviation $\Delta V'$. This correction voltage deviation $\Delta V'$ is the voltage deviation $\Delta V$ in which a high-frequency component thereof is amplified. The gain $K_h$ is set in accordance with the high-frequency component $\Delta V_h$ of the voltage deviation calculated by the highpass filter 511. Normally, $K_h$ is set as $K_h=1$, and when the high-frequency component $\Delta V_h$ of the voltage deviation is not less than a threshold set in advance, $K_h$ is set as $K_h>1$. In the current weakening command calculation unit of the present embodiment, the d-axis current command $i_d^*$, i.e., the current weakening command, is calculated by the compensator on the basis of the correction voltage deviation $\Delta V'$ outputted from this high-frequency amplification unit 51.

Similar to embodiment 2, the permanent-magnet-synchronous electric motor control device having such a configuration calculates a current weakening command in which a high-frequency component is amplified on the basis of the difference between the reference voltage value and the output voltage value. Therefore, flux weakening control for avoiding voltage saturation can be performed. In addition, since this permanent-magnet-synchronous electric motor control device amplifies a high-frequency component of the current weakening command, when the rotation speed has sharply changed, the permanent-magnet-synchronous electric motor control device can cause the current weakening command to follow the change. In addition, in a case where the output voltage sharply changes when the power supply voltage has sharply changed, the permanent-magnet-synchronous electric motor control device of the present embodiment can cause the current weakening command to follow the change.

In the present embodiment, a variable gain is used as means for amplifying a high-frequency component in the high-frequency amplification unit. In embodiment 2, a filter is used as means for amplifying a high-frequency component in the high-frequency amplification unit. The means for amplifying a high-frequency component in the high-frequency amplification unit is not limited to a variable gain or a filter, and a map set in advance or the like can also be used.

Embodiment 5

The configuration of a permanent-magnet-synchronous electric motor control device of embodiment 5 is similar to the configuration of the permanent-magnet-synchronous electric motor control device of embodiment 1. However, the output voltage value $V_a$, the reference voltage value $V_b$, and the integral gain $K_i$ of the compensator of the current weakening command calculation unit are different. Since the modulation factor has a similar meaning to an output voltage, the output voltage value $V_a$ and the reference voltage value $V_b$ are set on the basis of the modulation factor in the permanent-magnet-synchronous electric motor control device of the present embodiment.

The reference voltage value $V_b$ is given by a reference modulation factor $k^*$ ($V_b=k^*$). The value of the reference modulation factor $k^*$ is set to a value not greater than the maximum modulation factor $k_{max}$. Here, in order to utilize the power supply voltage to a maximum extent, $k^*$ is set as $k^*=k_{max}$. $k_{max}$ is determined according to the modulation method, and here, $k_{max}=1$. When the power supply voltage is caused to have a certain margin, $k^*$ may be set as $k^*=k_{max} \times 0.9$.

The output voltage value $V_a$ is given by a modulation factor $k_r$ ($V_a=k_r$) The modulation factor $k_r$ is calculated by Expression (5) and Expression (6) from the three-phase voltage commands $v_u^*$, $v_v^*$, $v_w^*$, and the power supply voltage $V_{dc}$. The modulation factor $k_r$ calculated by Expression (5) has an output voltage value calculated by Expression (1) as a numerator. Therefore, this modulation factor has a similar meaning to output voltage.

[Mathematical 5]

$$K_r = \sqrt{\frac{v_u^{*2} + v_v^{*2} + v_w^{*2}}{V_c}} \qquad (5)$$

[Mathematical 6]

$$V_c = \left(\frac{K_{max} \times V_{dc}}{\sqrt{2}}\right)^2 \qquad (6)$$

The integral gain $K_i$ of the compensator is given by Expression (7). The power supply voltage $V_{dc}$ may be a detected value or may be a value set in advance.

[Mathematical 7]

$$K_i = \frac{\omega_w}{\omega_m \times L} \times \frac{V_{dc}}{\sqrt{2}} \qquad (7)$$

Even when the output voltage value $V_a$, the reference voltage value $V_b$, and the integral gain $K_i$ are set in this manner, since the modulation factor has a similar meaning to output voltage, a high-frequency component of the current weakening command can be amplified as in embodiment 1.

Embodiment 6

Figure 8:
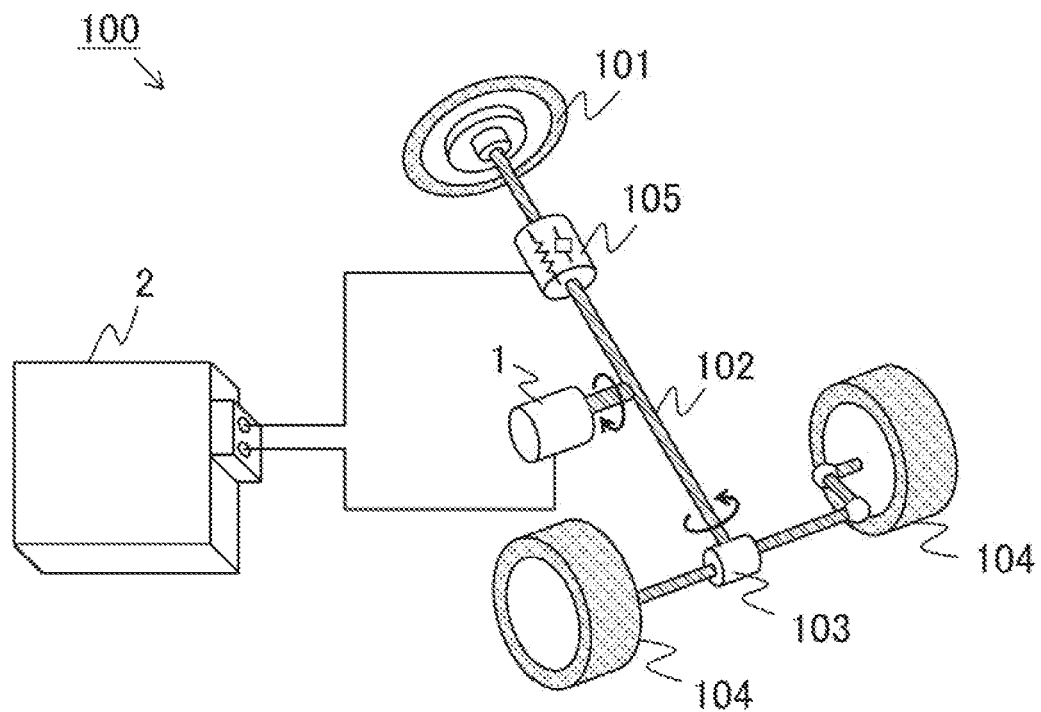
FIG. 8 is a configuration diagram of an electric power steering device according to embodiment 6.

Embodiment 6 relates to an electric power steering device including the permanent-magnet-synchronous electric motor control device described in each of embodiments 1 to 5. FIG. 8 is a configuration diagram of an electric power steering device according to the present embodiment. As shown in FIG. 8, an electric power steering device 100 of the present embodiment is composed of a steering wheel 101, a steering shaft 102, a rack-and-pinion gear 103, wheels 104, the permanent-magnet-synchronous electric motor 1 for assisting steering performed by a driver, the permanent-magnet-synchronous electric motor control device 2, and a torque sensor 105 for detecting a steering torque from the driver.

In the electric power steering device 100 shown in FIG. 8, a steering torque applied to the steering wheel 101 from the driver (not shown) is transmitted through a torsion bar of the torque sensor 105 and the steering shaft 102 to a rack via the rack-and-pinion gear 103, thereby steering the wheels 104. The permanent-magnet-synchronous electric motor 1 is driven by the permanent-magnet-synchronous electric motor control device 2, and generates an assist force as an output. The assist force is transmitted to the steering shaft to reduce the steering torque applied by the driver during steering.

An assist current command for adjusting the assist force outputted by the permanent-magnet-synchronous electric motor 1 is calculated in the permanent-magnet-synchronous electric motor control device 2 on the basis of the steering torque from the driver detected by the torque sensor 105. For example, the permanent-magnet-synchronous electric motor control device 2 calculates the q-axis current command on the basis of a value proportional to the steering torque from the driver. That is, the permanent-magnet-synchronous electric motor control device 2 uses the assist current command as the q-axis current command.

An the electric power steering device 100 having such a configuration, an assist torque according to steering performed by the driver can be obtained from the permanent-magnet-synchronous electric motor 1. Even when the driver has performed sudden steering and a sharp rotation speed change has been caused in the permanent-magnet-synchronous electric motor 1, the assist current command can follow the change, and thus, the assist torque is not decreased. As a result, an electric power steering device that allows comfortable steering can be realized.

As described above, when the permanent-magnet-synchronous electric motor control device described in each of embodiments 1 to 5 is applied to an electric power steering device, particularly remarkable effects can be obtained. In other devices, e.g., in a belt conveyor for transportation, conveyance at a constant speed is basically performed, and thus, a sharp rotation speed change does not occur. In machine tools, since a drive pattern is predetermined, it has been easy to take measures such as adding feedforward compensation in accordance with a sharp rotation speed change. In contrast to this, in a conventional electric power steering device, a sharp rotation speed change occurs due to sudden steering that cannot be predicted in advance. Therefore, it has been difficult to suppress decrease of torque due to the sharp rotation speed change. If the permanent-magnet-synchronous electric motor control device described in each of embodiments 1 to 5 is applied to an electric power steering device, decrease of torque due to a sharp rotation speed change that cannot be predicted can be suppressed.

Figure 9:
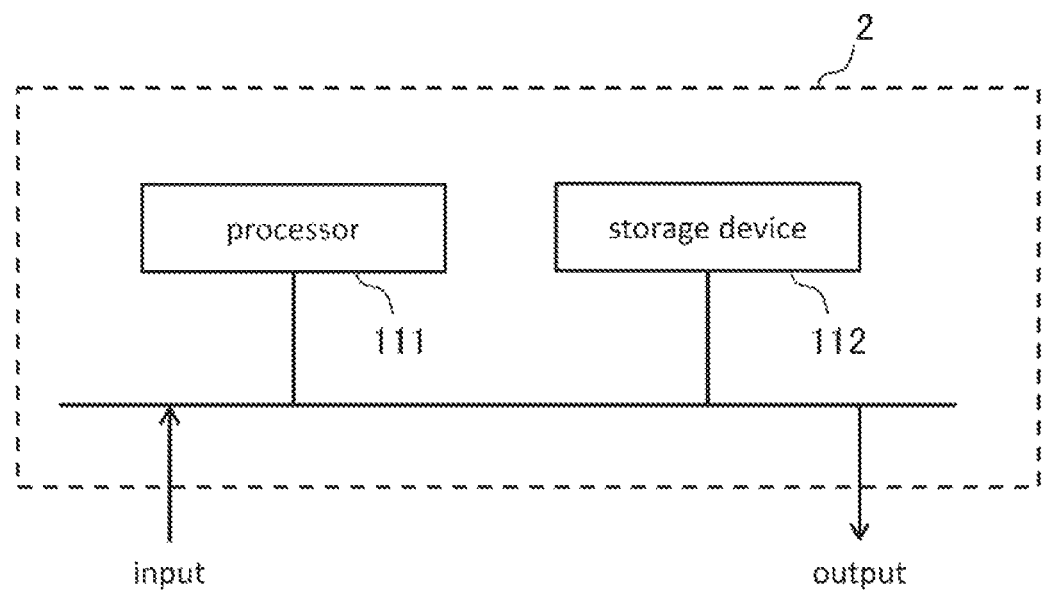
FIG. 9 is a schematic diagram showing an example of hardware of a permanent-magnet-synchronous electric motor control device according to each of embodiments 1 to 5.

As shown in an example of hardware shown in FIG. 9, the permanent-magnet-synchronous electric motor control device 2 described in each of embodiments 1 to 5 is composed of a processor 111 and a storage device 112. The storage device 112 includes, although not shown, a volatile storage device such as a random access memory, and a nonvolatile auxiliary storage device such as a flash memory. Instead of a flash memory, a hard disk as an auxiliary storage device may be provided. The processor 111 executes a program inputted from the storage device 112. In this case, the program is inputted to the processor 111 from the auxiliary storage device via the volatile storage device. The processor 111 may output data such a calculation result to the volatile storage device of the storage device 112, or may store data in the auxiliary storage device via the volatile storage device.

Although the present disclosure is described above in terms of various exemplary embodiments and implementations, it should be understood that the various features, aspects, and functionality described one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS 1 permanent-magnet-synchronous electric motor
2 permanent-magnet-synchronous electric motor control device
3 reference voltage value calculation unit
4 output voltage value calculation unit
5 current weakening command calculation unit
6 voltage command calculation unit
7 power converter
11 angle detector
51 high-frequency amplification unit
52 subtractor
53 compensator
61 coordinate conversion unit
62 voltage command generation unit
511 highpass filter
512 multiplier
621, 622 subtractor
623, 624 PI controller
100 electric power steering device
101 steering wheel
102 steering shaft
103 rack-and-pinion gear
104 wheel
105 torque sensor
111 processor
112 storage device

The invention claimed is:

1. A permanent-magnet-synchronous electric motor control device comprising:
a reference voltage value calculation circuitry to calculate a reference voltage value on the basis of power supply voltage;
an output voltage value calculation circuitry to calculate an output voltage value on the basis of a voltage command;
a current weakening command calculation circuitry to calculate a current weakening command being a d-axis current command for flux weakening control on the basis of the reference voltage value and the output voltage value;
a voltage command calculation circuitry to calculate the voltage command on the basis of the current weakening command; and
a power converter for supplying power to a permanent-magnet-synchronous electric motor on the basis of the voltage command, wherein
the current weakening command calculation circuitry calculates the current weakening command in which a high-frequency component is amplified on the basis of a difference between the reference voltage value and the output voltage value using a filter that amplifies a high-frequency component.

2. The permanent-magnet-synchronous electric motor control device according to claim 1, wherein
the current weakening command calculation circuitry comprises:
a high-frequency amplification circuitry to amplify a high-frequency component of the output voltage value by using a filter for amplifying a high-frequency component, to calculate a correction output voltage value;

a subtractor for calculating a voltage deviation being a difference between the reference voltage value and the correction output voltage value calculated by the high-frequency amplification circuitry; and a compensator for calculating the current weakening command on the basis of the voltage deviation calculated by the subtractor.

3. The permanent-magnet-synchronous electric motor control device according to claim 1, wherein the current weakening command calculation circuitry comprises:

a subtractor for calculating a voltage deviation being a difference between the reference voltage value and the output voltage value;

a high-frequency amplification circuitry to amplify a high-frequency component of the voltage deviation by using a filter for amplifying a high-frequency component, to calculate a correction voltage deviation; and a compensator for calculating the current weakening command on the basis of the correction voltage deviation calculated by the high-frequency amplification circuitry.

4. The permanent-magnet-synchronous electric motor control device according to claim 1, wherein the current weakening command calculation circuitry comprises:

a subtractor for calculating a voltage deviation being a difference between the reference voltage value and the output voltage value;

a compensator for calculating a basic current weakening command on the basis of the voltage deviation; and a high-frequency amplification circuitry for amplifying a high-frequency component of the basic current weakening command by using a filter for amplifying a high-frequency component, to calculate the current weakening command.

5. The permanent-magnet-synchronous electric motor control device according to claim 2, wherein the filter for amplifying the high-frequency component is a phase advance filter.

6. The permanent-magnet-synchronous electric motor control device according to claim 3, wherein the high-frequency amplification circuitry is composed of a highpass filter for extracting a high-frequency component of the voltage deviation, and a multiplier for multiplying the voltage deviation by a gain set on the basis of the high-frequency component of the voltage deviation extracted by the highpass filter, to output a correction voltage deviation.

7. The permanent-magnet-synchronous electric motor control device according to claim 1, wherein the reference voltage value calculation circuitry uses a reference modulation factor calculated from the power supply voltage, as the reference voltage value, and the output voltage value calculation circuitry uses a modulation factor calculated from the power supply voltage and the voltage command, as the output voltage value.

8. An electric power steering device comprising:

a permanent-magnet-synchronous electric motor for generating an assist torque for assisting a steering torque from a driver; and the permanent-magnet-synchronous electric motor control device according to claim 1.

* * * * *